United States Patent [19]

Krämer

[11] Patent Number: 5,015,126
[45] Date of Patent: May 14, 1991

[54] METHOD OF AND APPARATUS FOR SUPPLYING PULVERULENT MATERIAL TO A PROCESSING DEVICE

[76] Inventor: Erich Krämer, Röthenstrasse 21, 8628 Michelau, Fed. Rep. of Germany

[21] Appl. No.: 334,868

[22] Filed: Apr. 6, 1989

[30] Foreign Application Priority Data

Apr. 14, 1988 [DE] Fed. Rep. of Germany ....... 3812466
Aug. 9, 1988 [DE] Fed. Rep. of Germany ....... 3827014

[51] Int. Cl.$^5$ .............................................. B65G 53/42
[52] U.S. Cl. ................................. 406/152; 406/134; 406/137
[58] Field of Search ............... 406/152, 153, 151, 146, 406/134, 137, 141, 75, 142, 113, 18

[56] References Cited

U.S. PATENT DOCUMENTS

| | | | |
|---|---|---|---|
| Re. 32,841 | 1/1989 | Mulder | 406/141 |
| 1,691,223 | 11/1928 | Brooks et al. | 406/142 |
| 1,971,123 | 8/1934 | Tappen | 406/141 |
| 2,301,617 | 11/1942 | Cox | 406/152 |
| 2,955,880 | 10/1960 | Schlicksupp | 406/153 |
| 3,785,568 | 1/1974 | Pfingsten et al. | 406/142 |
| 4,265,572 | 5/1981 | Bourdois et al. | 406/152 |
| 4,505,623 | 3/1985 | Mulder | |
| 4,609,309 | 9/1986 | Aralt | 406/142 |
| 4,872,598 | 10/1989 | Travis | 406/146 |

FOREIGN PATENT DOCUMENTS

| | | | |
|---|---|---|---|
| 0184994 | 5/1988 | European Pat. Off. | |
| 494985 | 6/1954 | Italy | 406/141 |
| 355083 | 7/1961 | Switzerland | |
| 2123781 | 2/1984 | United Kingdom | 406/141 |

Primary Examiner—Joseph F. Peters, Jr.
Assistant Examiner—Anne E. Bidwell
Attorney, Agent, or Firm—Henry M. Feiereisen

[57] ABSTRACT

A method of and apparatus for supplying pulverulent material includes a fluidizing unit which is introduced into a transport container containing the pulverulent material. The fluidizing unit causes suspension or floating of the pulveulent material in the transport container. A suction unit and a discharge unit such as an injector withdraws fluidized pulverulent material and conveys it to the processing device. The fluidizing unit and the discharge unit are preferably combined to a constructional unit which is adjustable relative to the fluidizing unit. Thus, the use of separate powder containers is avoided as the transport container in which the pulverulent material is contained is directly used as a powder container.

13 Claims, 2 Drawing Sheets

METHOD OF AND APPARATUS FOR SUPPLYING PULVERULENT MATERIAL TO A PROCESSING DEVICE

BACKGROUND OF THE INVENTION

The invention relates to a method of and apparatus for supplying a pulverulent material to a processing device such as a powder coating device.

Hitherto, the pulverulent material delivered by the manufacturer in a carton containing the pulverulent material in a sack was poured out of the sack for example into a powder container of a powder coating device. The powder container is designed in such a manner that the introduced powder is suspended or floats therein by means of a fluid such as air, and a fluidizing unit. A separate injector conveys the suspended or floating pulverulent material to the powder coating device. When changing the powder, the powder container must be completely cleaned for example by blowing out in order to avoid a mixture with the newly used powder. Furthermore, the residual powder amount still disposed in the powder container is frequently thrown away when the color is changed so that hitherto a considerable amount of waste had to be accepted when changing the powder.

SUMMARY OF THE INVENTION

It is thus an object of the present invention to overcome the afore-stated drawbacks by providing an improved apparatus for and improved method of supplying a pulverulent material to a processing device so as to obviate complicated operations when changing color or changing powder, and to allow reuse of residual powder to thereby avoid large powder waste amounts.

In accordance with the present invention, a method is provided in which the pulverulent material is suspended by means of a fluid and a fluidizing unit and subsequently conveyed to the processing device. According to a feature of the present invention, the fluidization is attained by directly introducing the fluidizing unit into the pulverulent material contained in the transport container and by discharging the thus fluidized pulverulent material from the container.

By providing a method according to the invention, no special powder containers are required but instead the carton or cardboard with the sack contained therein i.e. the so-called package unit is used directly as powder container. Into the powder container, the fluidizing unit is introduced into the pulverulent material by starting from the top and during the advance fluid emerges via the fluidizing unit so that the pulverulent material in the region of the fluidizing unit is loosened during the introduction so as to facilitate the introduction operation. The fluid such as air can be introduced at a pressure of 0.2 to 1 bar. When the fluidizing unit has been introduced in this manner up to the vicinity of the bottom of the transport container, the fluid emerging from the fluidizing unit causes a suspension of the pulverulent material, and a respective discharge unit discharges the thus fluidized pulverulent material from the powder transport container which serves as powder container.

Through the provision of a method according to the invention, cleaning of the powder container as was hitherto necessary during each color change can be eliminated, and in addition, in the event of a powder change, the fluidizing unit can simply be removed from the sack and blown off. As a result, the amounts of waste occurring during a color change can surprisingly be reduced.

According to the present invention, the powder container is the transport container for the pulverulent material, and the fluidizing unit is immersed in the pulverulent material within the transport container. By designing the apparatus in accordance with the invention, the transport container which contains the powder is directly employed for supplying the pulverulent material to a processing device for example a powder coating device so that the use of hitherto complicated devices is avoided. During powder change, it is also possible to avoid all cleaning steps which hitherto had to be carried out when separate powder containers were used to supply the pulverulent material.

The fluidizing unit can be arranged suspended and can be moved for example automatically into the pulverulent material contained in the powder transport container under the effect of its own weight. It may, however, also be placed onto the powder.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
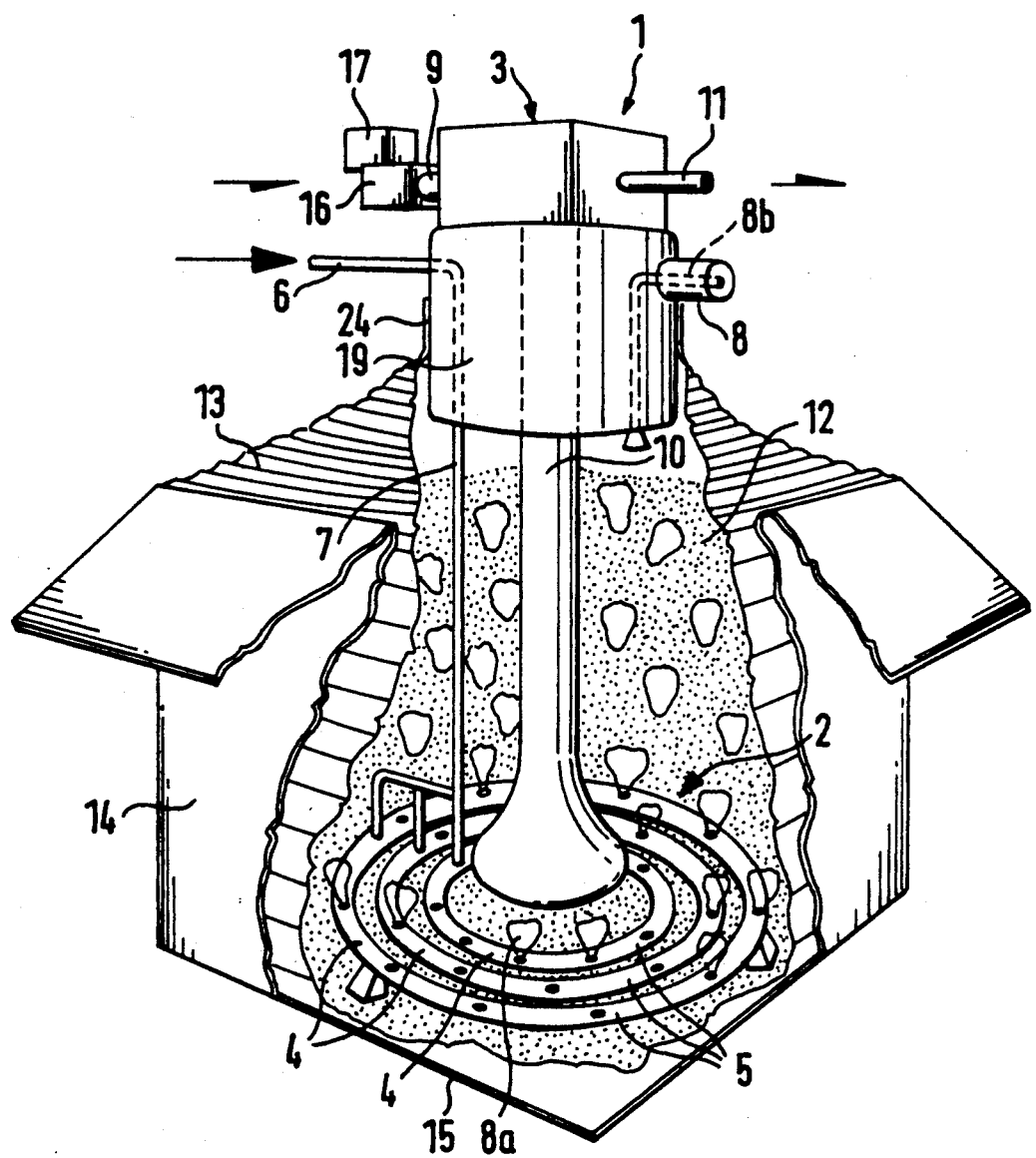
FIG. 1 is a schematic perspective view of a first embodiment of an apparatus according to the invention for supplying pulverulent material.

Referring now to the drawing, and in particular to FIG. 1, there is shown a schematic perspective illustration of a first embodiment of an apparatus according to the invention for supplying pulverulent material and generally designated by reference numeral 1. The supply apparatus 1 includes a fluidizing unit which is generally designated by reference numeral 2 and a discharge unit in form of an injector generally designated by reference numeral 3. In the nonlimiting example of FIG. 1, the fluidizing unit 2 and the injector 3 define a constructional unit which is commonly operated. The fluidizing unit 2 includes a plurality of fluidizing elements 4 which are designed as fluidizing rings 5. Of course, these fluidizing elements 4 may also be designed in a different manner, for example quadrilateral, oval, rhomboidal or the like as well as in combinations thereof. The fluidizing elements 4 or the fluidizing rings 5 may be arranged radially behind each other in one plane or at different levels. Reference numeral 6 designates an inlet for a fluid such as air which communicates with the fluidizing elements 4 of the fluidizing unit 2 via a conduit 7 schematically indicated in FIG. 1. The air 8a escaping from the fluidizing elements 4 is discharged via an outlet 8 and released to the ambient air via a subsequent fine filter 8b. This release avoids excess pressure in the transport container.

The injector 3 has a compressed air inlet 9 which communicates via the injector 3 with the interior of a suction unit in form of a suction tube 10. On the outlet side of the injector 3, an outlet 11 is schematically indicated via which the fluidized powder is conveyed to a powder coating device which for ease of illustration is not shown. As is shown in FIG. 1, the inlet region of the injector 3 may be preceded by a valve 16 equipped with a timer 17 so that the supply apparatus 1 can be used to deliver controlled doses for an automatically operating powder coating plant.

The arrangement of injector 3 and suction tube 10 is preferably adjustable relative to the fluidizing unit 2 so that the lower free end of the suction tube 10 can be set in an optimum manner in correspondence with prevailing conditions with regard to effectiveness and position of the fluidizing unit 2.

The apparatus 1 with the fluidizing unit 2 and the injector 3 is immersed into the pulverulent material which is designated by reference numeral 12 and contained in a sack 13 inserted into a carton or cardboard 14. In this form, the powder is delivered by a manufacturer as package unit and the sack 13 with the carton 14 forms the powder transport container. As indicated schematically in FIG. 1, the fluidizing unit 2 or the fluidizing elements 4 are designed in such a manner so as to define support feet which in the final position rest on the bottom 15 of the transport container 13 and 14 so that the apparatus 1 stands firmly on the bottom 15. Although not shown, the fluidizing unit 2 with the fluidizing elements 4 may also be suspended.

After having described the components of the apparatus according to the invention, its mode of operation for supplying a pulverulent material to a processing device will now be set forth in more detail.

After opening the carton 14 and opening the sack 13, the constructional unit of fluidizing unit 2 and injector 3 is introduced into the pulverulent material 12 contained in the sack 13 from top to bottom. During introduction, air is fed into the fluidizing unit 2 so that the pulverulent material in the sack 13 is loosened and fluidized to thereby facilitate the insertion of the apparatus 1 into the transport container. Possibly, the apparatus 1 can be introduced mechanically into the sack 13 of pulverulent material 12 without using air. When the apparatus 1 has reached its end position and for example the foot-like portions of the fluidizing elements 4 rest on the bottom 15, the pulverulent material is brought into suspension within the sack 13 by means of the fluidizing elements 4 and the air 8a escaping thereabove. The upper open end of the sack 13 is tightly connected to the constructional unit of fluidizing unit 2 and injector 3. The pulverulent material 12 suspended or fluidized by the fluidizing unit 2 is withdrawn via the suction tube 10 by the injector 3, and a powder-air mixture is delivered via the discharge conduit 11 to the subsequent powder coating device. The fluidized pulverulent material is withdrawn from the cross sectional area of the transport container in immediate vicinity of the fluidizing unit 2. In accordance with their shape, the fluidizing elements 4 cause the pulverulent material to be suspended in sheet-like manner in correspondence with the illustrated embodiment, and the pulverulent material 12 fluidized by means of the fluidizing unit 2 is urged by the suction effect to the entrance of the suction tube 10. Although not illustrated in FIG. 1, the fluidizing unit 2 can cause a suspension of the pulverulent material 12 in punctiform configuration via its fluidizing elements 4.

In the event, a color change in the entire plant is to be carried out, only the apparatus 1 according to the invention is removed from the sack 13 with the pulverulent material contained therein and with the fluidizing unit 2 and the injector 3 being switched off. After removal of the apparatus 1 from the sack 13, the latter can then be sealed again at its upper end and carried away together with the carton 14. If at a later time, the same pulverulent material is used, the carton 14 and the sack 13 containing clean powder is transported to the place of use, and the apparatus 1 according to the invention is then introduced into the sack 13 containing the pulverulent material in a manner described above. Thus, the amount of waste occurring during a color change is considerably reduced, and in particular a cleaning as previously required for separate powder containers is eliminated.

Figure 2:
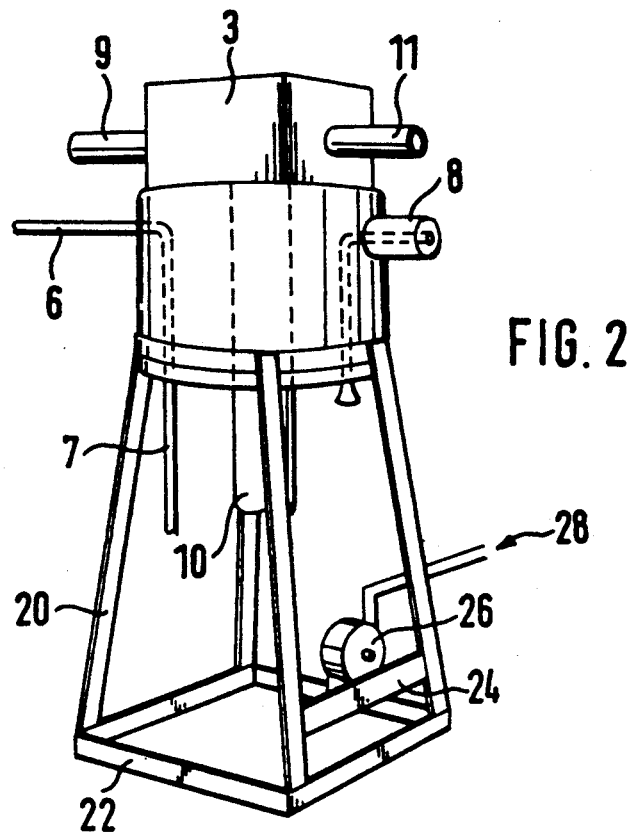
FIG. 2 is a schematic perspective view of a second embodiment of an apparatus according to the invention for supplying pulverulent material, illustrating a vibrator for improving the conveying of pulverulent material.

Turning now to FIG. 2, there is shown a schematic perspective view of a second embodiment of an apparatus according to the invention for supplying pulverulent material. During operation of the apparatus 1, some types of powder may not completely be fluidized and discharged. Therefore, in accordance with a further embodiment of the present invention, the discharge unit 3 is provided with feet 20 which at their lower end are preferably braced with each other by rails or a band 22 of sheet metal. In the area of the lower ends of the feet 20, a vibrator 26 is attached, for example directly to the band 22, or as illustrated in FIG. 2 to a rail 24 which extends between two feet 20. Suitably, the vibrator 26 is screwed to the rail 24. The vibrator 26 is provided with connecting lines 28 and may be an electrically operated vibrator or an oscillating motor, for example a conventional revolving ball motor which is pneumatically driven.

It has been found during operation, that by using a vibrator, such as vibrator 26, the apparatus 1 according to the invention, after being placed onto the pulverulent material, moves rapidly and quickly downwards and allows all residues of the pulverulent material to be fluidized by the fluidizing unit 2 and to be picked up by the discharge unit 3 for transport to the not shown powder coating cabin.

Figure 3:
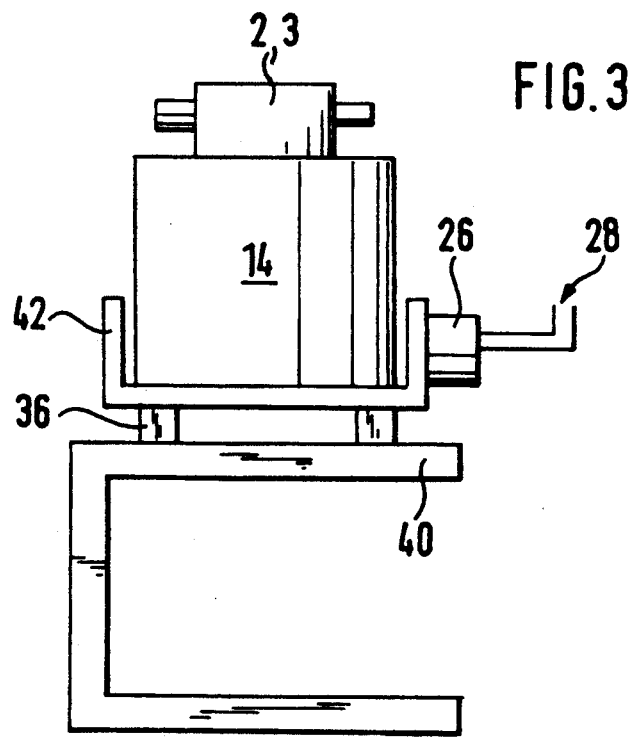
FIG. 3 is a schematic illustration of a third embodiment of an apparatus according to the invention for supplying pulverulent material.

Referring now to FIG. 3, there is shown a schematic illustration of a third embodiment of an apparatus according to the invention for supplying pulverulent material and including a vibrator 26 mounted to a frame which supports the powder container 40 i.e. the carton in which the powder is delivered.

The frame is made of two parts and includes a lower part 40 which represents the actual frame and an upper part 42 which in the illustrated embodiment is shaped as flat, cup-shaped container which receives the powder container 14. Instead of being cup-shaped, the upper part 42 may simply be a flat plate in which case precautions should be taken to prevent the powder container 14 from dropping from or slipping off the plate. The lower and upper parts 40, 42 of the frame are swingably mounted to each other via a conventional vibration bearing 36, with the vibrator 26 being mounted to the upper part 42 of the frame. Upon actuation of the vibrator 26, the upper part 42 of the frame with the powder container 14 are thus oscillated.

When being inserted into the carton or powder container 14, it has been found that that the fluidizing unit 2 with the injector 3 may drift from the vertical alignment. Thus, guidances such as vertical guide rails may be provided along which the fluidizing unit 2 with injector 3 is displacable in order to prevent such misalignment.

The fluidizing unit may be introduced from top to bottom into the sack or the transport container but it may also be stationarily installed, with the transport container and the sack for example being placed on a table which is moved upwardly toward the fluidizing unit so that the fluidizing unit necessarily is immersed in the pulverulent material in the transport container.

While the invention has been illustrated and described as embodied in a method of and apparatus for supplying a pulverulent material to a processing device, it is not intended to be limited to the details shown since various modifications and structural changes may be made without departing in any way from the spirit of the present invention.

What is claimed as new and desired to be protected by Letters Patent is set forth in the appended claims:

1. Apparatus for supplying pulverulent material contained within a conventional transport container to a processing device, comprising:
    fluidizing means adapted for direct introduction into the transport container for fluidizing the pulverulent material within the transport container and including a plurality of radially spaced fluidizing elements; and
    discharge means for conveying the fluidized pulverulent material from the transport container to the processing device.

2. Apparatus as defined in claim 1 wherein said fluidizing elements are arranged at different levels.

3. Apparatus as defined in claim 2 wherein said fluidizing elements are provided in form of concentric fluidized rings.

4. Apparatus as defined in claim 1 wherein said fluidizing means is suspended in said transport container.

5. Apparatus as defined in claim 1 wherein said discharge means includes a suction unit and defines with said fluidizing means a constructional unit.

6. Apparatus as defined in claim 5, and further comprising a vibrator attached to said constructional unit of fluidizing means and discharge means.

7. Apparatus as defined in claim 6 wherein said discharge means is provided with feet, said vibrator being attached to said feet at the lower end thereof.

8. Apparatus as defined in claim 6, and further comprising a frame supporting said transport container, said vibrator being mounted to said frame.

9. Apparatus as defined in claim 8 wherein said frame includes a lower part and an upper part accommodating said transport container and swingably mounted to said lower part via suitable bearings, said vibrator being mounted to said upper part so that upon actuation of said vibrator said upper part is allowed to oscillate relative to said lower part.

10. Apparatus as defined in claim 5 wherein said discharge means is an injector including a suction pipe through which pulverulent material is withdrawn, said injection being operated with a fluid which entrains fluidized pulverulent material through said suction pipe to an outlet for supplying the processing device.

11. Apparatus as defined in claim 1, and further comprising valve means including a timer for allowing supply of pulverulent material in controlled doses, said valve means being connected to said discharge means in the inlet area thereof.

12. Apparatus for supplying pulverulent material contained within a conventional transport container to a processing device, comprising:
    fluidizing means adapted for direct introduction into the transport container for fluidizing the pulverulent material within the transport container;
    discharge means for conveying the fluidized pulverulent material from the transport container to the processing device, said discharge means being provided with feet; and
    a vibrator attached to said feet at the lower end thereof.

13. Apparatus for supplying pulverulent material contained within a conventional transport container to a processing device, comprising:
    fluidizing means including a plurality of radially spaced fluidizing elements in form of concentric fluidizing rings and adapted for direct introduction into the transport container for fluidizing the pulverulent material within the transport container; and
    discharge means including a suction unit for conveying the fluidized pulverulent material from the transport container to the processing device;
    wherein said fluidizing means and said discharge means define a constructional unit being suspended in the powder container.

* * * * *